United States Patent
Gomes et al.

(10) Patent No.: US 11,636,729 B2
(45) Date of Patent: Apr. 25, 2023

(54) ONLINE GAME MOBILE CONTROLLER

(71) Applicant: CRISTALTEC SpA, Oporto (PT)

(72) Inventors: José Samuel Pereira Gomes, Maia (PT); Manuel José Martins Teixeira De Melo, Oporto (PT)

(73) Assignee: CRISTALTEC S.P.A., Rome (IT)

( * ) Notice: Subject to any disclaimer, the term of this patent is extended or adjusted under 35 U.S.C. 154(b) by 192 days.

(21) Appl. No.: 17/161,755

(22) Filed: Jan. 29, 2021

(65) Prior Publication Data
US 2021/0248867 A1 Aug. 12, 2021

Related U.S. Application Data

(60) Provisional application No. 62/967,722, filed on Jan. 30, 2020.

(51) Int. Cl.
*G07F 17/32* (2006.01)
*G06F 21/36* (2013.01)
*G06F 16/955* (2019.01)
*G06K 7/14* (2006.01)

(52) U.S. Cl.
CPC ...... *G07F 17/3225* (2013.01); *G06F 16/9554* (2019.01); *G06F 21/36* (2013.01); *G06K 7/1417* (2013.01); *G06F 2221/2109* (2013.01)

(58) Field of Classification Search
USPC .......................................... 463/29
See application file for complete search history.

(56) References Cited

U.S. PATENT DOCUMENTS

2021/0248867 A1* 8/2021 Gomes .................... G06F 21/36
2022/0019640 A1* 1/2022 Hermann ............... G06F 16/972

* cited by examiner

*Primary Examiner* — Pierre E Elisca
(74) *Attorney, Agent, or Firm* — Cantor Colburn LLP

(57) ABSTRACT

Embodiments of the present invention are directed to an online gaming mobile controller. A computer-implemented method is provided that generates, using a processor, a QR code containing a web address for a gaming session and provides, using the processor, the QR code to a monitor. The method receives, using the processor, a request for serving a web page for the web address from a user device and provides, using the processor, an authentication page for entering a PIN code to the user device. The method provides, using the processor, a PIN code to the monitor and receives, using the processor, an entered code from the user device. When the entered code matches the PIN code, the method associates the user device with the gaming session.

20 Claims, 9 Drawing Sheets

ONLINE GAME MOBILE CONTROLLER

CROSS REFERENCE TO RELATED APPLICATIONS

This application is a Non-Provisional application of U.S. Provisional application Ser. No. 62/967,722, filed Jan. 30, 2020, the disclosure of which is incorporated by reference herein in its entirety herein.

BACKGROUND

The present invention relates to gaming, and more specifically, to an online gaming mobile controller.

Computer gaming, both monetary and non-monetary, is rapidly exploding in popularity around the world. Gaming consoles are frequently connected to a network, such as the Internet. Users interact with gaming consoles or gaming monitors using either attached or remote controllers.

SUMMARY

Embodiments of the present invention are directed to an online gaming mobile controller. A computer-implemented method is provided that generates, using a processor, a QR code containing a web address for a gaming session and provides, using the processor, the QR code to a monitor. The method receives, using the processor, a request for serving a web page for the web address from a user device and provides, using the processor, an authentication page for entering a personal identification number (PIN) code to the user device. The method provides, using the processor, a PIN code to the monitor and receives, using the processor, an entered code from the user device. When the entered code matches the PIN code, the method associates the user device with the gaming session.

A system and computer program product that implement the method are also provided.

DETAILED DESCRIPTION

Currently, it is possible to run an online casino game on a variety of platforms, including, but not limited to, personal computers (via a browser, for example), a mobile device, a television/monitor browser, or a mobile application (app). The primary means of controlling these platforms is through conventional input means, such as mice, keyboards, or touch. This necessitates that a player or user is within arms-reach of the platform where the game is running. This gives the player the same experience as writing in a word processor with a keyboard and mouse.

Prior systems attempted to remedy this problem by relying upon dedicated controllers or dedicated apps running on a user device. This could be cumbersome and oft-putting, as users frequently do not have access to a dedicated device as they walk through a casino and are reluctant to download and put a dedicated app on their phone due to privacy and safety concerns.

Embodiments consistent with the present invention remove this tethering and provides for a game controller to run on a user's user device, such as her mobile phone, and that connects with a game session running on a nearby computer or monitor. This permits the player to control the game from her device, while providing additional functionality that improves the game experience. Customized controls may be provided for each game, and sound effects can come, not just from the gaming monitor, but also from the user device that she is using as a controller. In addition, multiple user devices may be used by respective multiple players to all play the same game, for example, blackjack.

Figure 1:
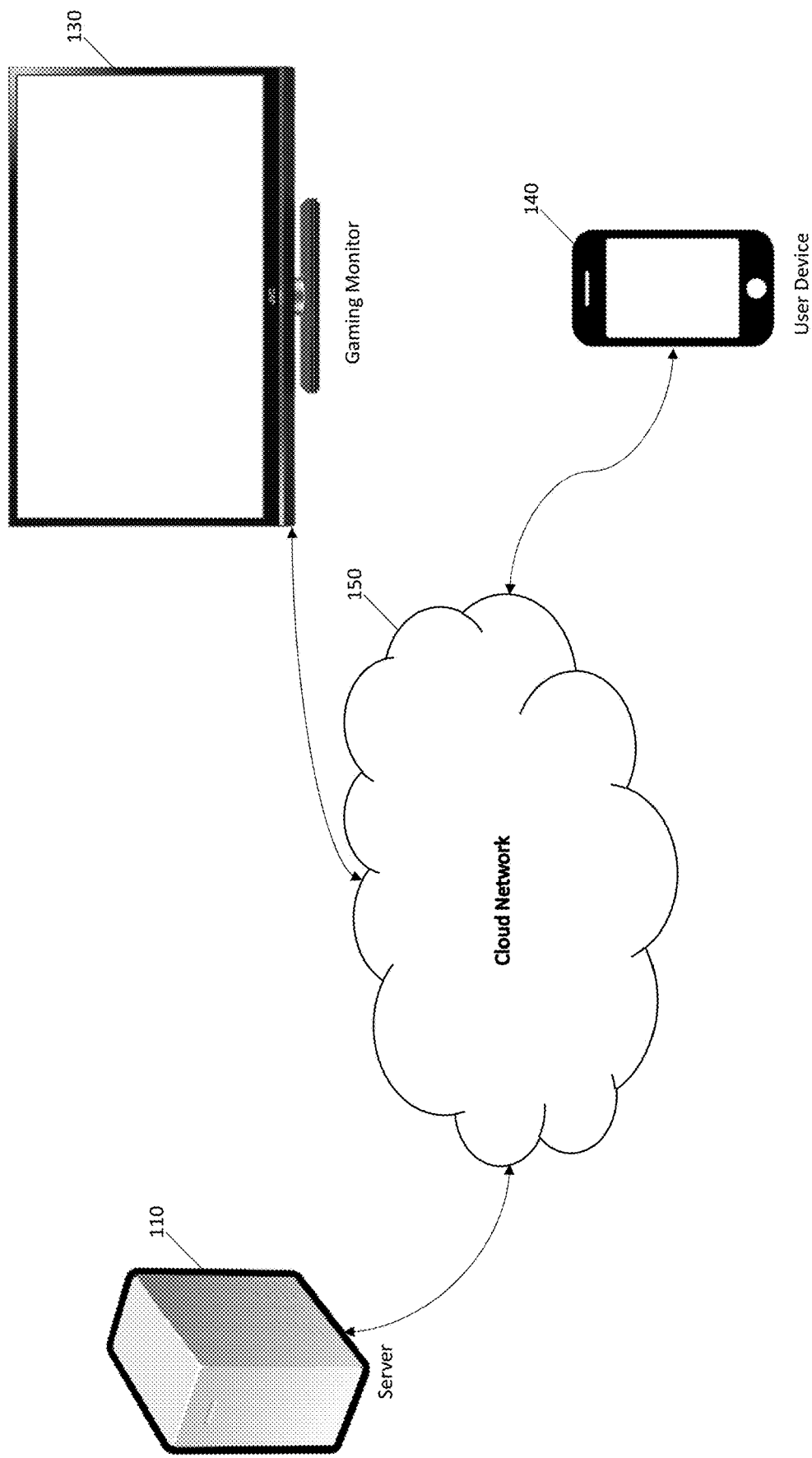
FIG. 1 depicts an exemplary embodiment of a gaming system connected through a network consistent with the present invention.

FIG. 1 depicts an exemplary embodiment of a gaming system consistent with the present invention. The gaming system comprises a gaming server 110 connected with a gaming monitor 130 and a user device 140 by way of a network, such as Internet 150. These may operate in a cloud computing environment. The user device is typically a smart phone or a tablet computer, but is not limited to those devices. The gaming server 110 and gaming monitor 130 do not need to be remote from each other, as embodiments consistent with the present invention will also operate with a gaming server 110 that connects directly with gaming monitor 130. As another example, the user device 140 may connect directly with the gaming monitor 130 and/or the gaming server 110 via local network, mesh network, WIFI network, or Bluetooth. The gaming server 110, gaming monitor 130, and user device 140 may be implemented as described with respect to the computer discussed in FIG. 2.

Figure 2:
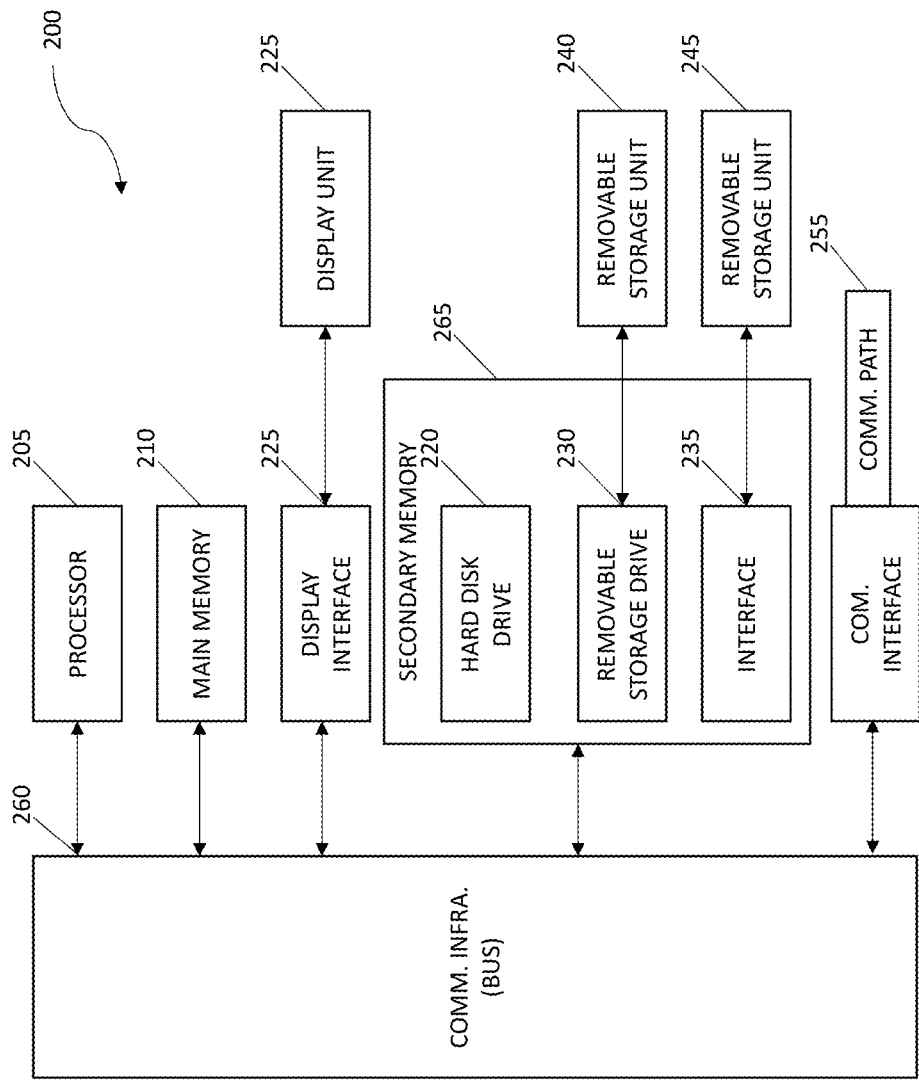
FIG. 2 depicts a high-level block diagram computer system, which can be used to implement one or more aspects of the present invention.

FIG. 2 depicts a high-level block diagram computer system 200, which can be used to implement one or more aspects of the present invention. More specifically, computer system 200 can be used to implement some hardware components of embodiments of the present invention. Although one exemplary computer system 200 is shown, computer system 200 includes a communication path 255, which connects computer system 200 to additional systems (not depicted) and can include one or more wide area networks (WANs) and/or local area networks (LANs) such as the Internet, intranet(s), and/or wireless communication network(s). Computer system 200 and additional system are in communication via communication path 255, e.g., to communicate data between them.

Computer system 200 includes one or more processors, such as processor 205. Processor 205 is connected to a communication infrastructure 260 (e.g., a communications bus, cross-over bar, or network). Computer system 200 can include a display interface 215 that forwards graphics, text, and other data from a communication infrastructure 260 (or from a frame buffer not shown) for display on a display unit 225. Computer system 200 also includes a main memory 210, preferably random access memory (RAM), and can also include a secondary memory 265. Secondary memory 265 can include, for example, a hard disk drive 220 and/or a removable storage drive 230, representing, for example, a floppy disk drive, a magnetic tape drive, or an optical disk drive. The removable storage drive 230 reads from and/or writes to a removable storage unit 240 in a manner well known to those having ordinary skill in the art. Removable storage unit 240 represents, for example, a floppy disk, a compact disc, a magnetic tape, or an optical disk, etc. which is read by and written to by removable storage drive 230. As will be appreciated, removable storage unit 240 includes a computer readable medium having stored therein computer software and/or data.

In alternative embodiments, secondary memory 265 can include other similar means for allowing computer programs or other instructions to be loaded into the computer system. Such means can include, for example, a removable storage unit 245 and an interface 235. Examples of such means can include a program package and package interface (such as that found in video game devices), a removable memory chip (such as an EPROM, or PROM) and associated socket, and other removable storage units 245 and interfaces 235, which allow software and data to be transferred from the removable storage unit 245 to computer system 200.

Computer system 200 can also include a communications interface 250.

Communications interface 250 allows software and data to be transferred between the computer system and external devices. Examples of communications interface 250 can include a modem, a network interface (such as an Ethernet card), a communications port, or a PCM-CIA slot and card, etcetera. Software and data transferred via communications interface 250 are in the form of signals, which can be, for example, electronic, electromagnetic, optical, or other signals capable of being received by communications interface 250. These signals are provided to communications interface 250 via communication path (i.e., channel) 255. Communication path 255 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 210 and secondary memory 265, removable storage drive 230, and a hard disk installed in hard disk drive 220. Computer programs (also called computer control logic) are stored in main memory 210 and/or secondary memory 265. Computer programs can also be received via communications interface 250. Such computer programs, when run, enable the computer system to perform the features of the present invention as discussed herein. In particular, the computer programs, when run, enable processor 205 to perform the features of the computer system. Accordingly, such computer programs represent controllers of the computer system.

Figure 3:
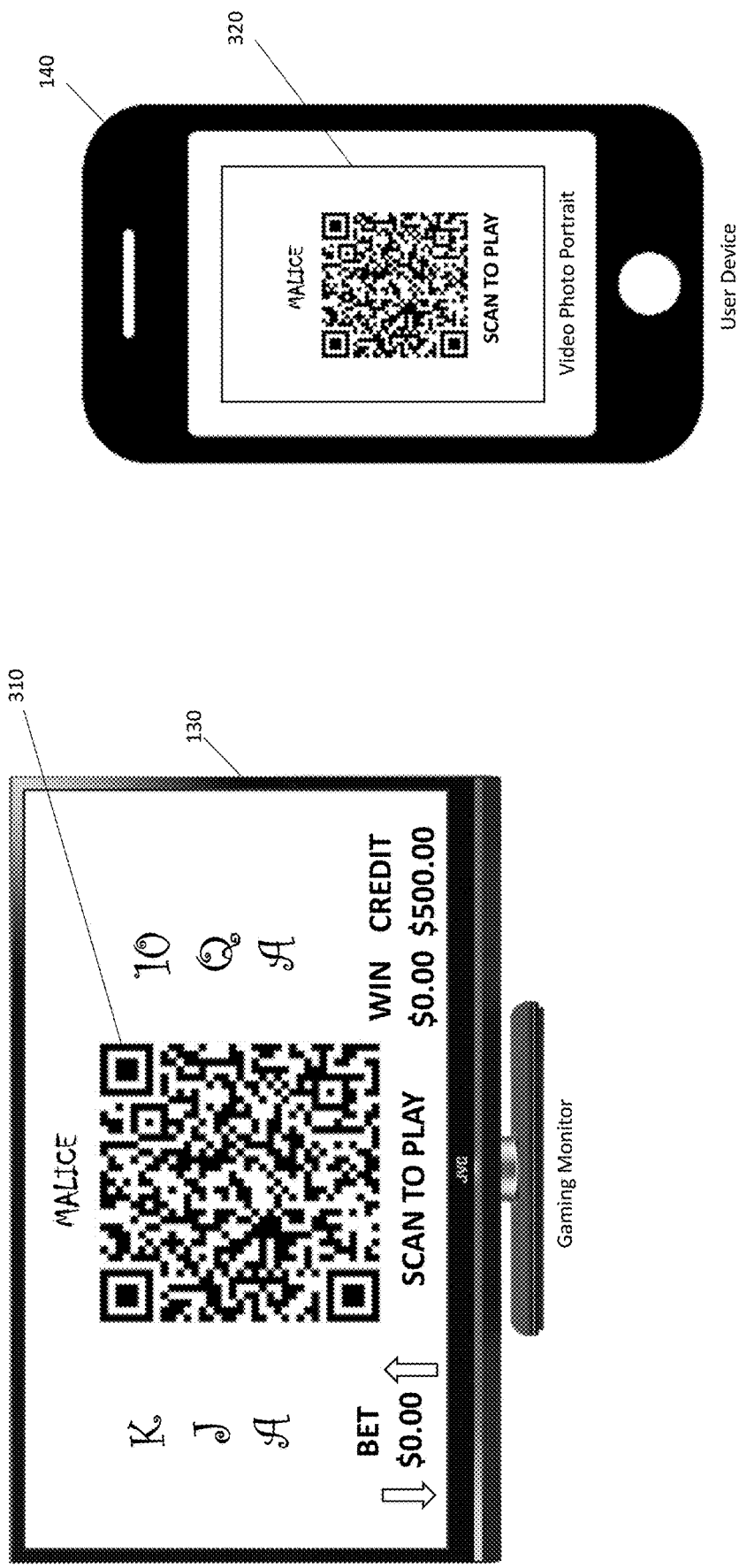
FIG. 3 depicts a screen of a gaming monitor and a screen of a user device consistent with the present invention.

FIG. 3 depicts a screen of a gaming monitor and a screen of a user device consistent with the present invention. The gaming monitor 130 displays a quick response (QR) code 310 overlay on top of the game screen. The QR code is a machine-readable matrix barcode. The QR code 310 encodes a web site address uniform resource locator (URL). A user using a user device 140 uses a photography or QR code reading app 320 to focus the user device's camera on to the QR code 310. The photography or QR code reading app 320 detects the QR code 310 on the game screen and translates the code to display a prompt 410 on the display of the user device 140.

The gaming server 110 can be configured to display the QR code on the gaming monitor 130 at various instances. The gaming server 110 can monitor a progress of a game displayed on the gaming monitor 130. The gaming server 110 can be configured to display a QR code 310 so as to not interrupt the flow of the game. For example, the gaming server can monitor a game of blackjack and display a QR code 310 before a round of blackjack has begun and another QR code 310 after the round has completed and prior to a next round of blackjack. In certain instances, the gaming session can be organized in a tournament format, in which some players are eliminated, but new players are not permitted to enter a game. In these instances, the gaming server 110 can be configured to display a QR code 310 on the gaming monitor 130 prior to the tournament beginning and refrain from displaying another QR code 310 until after a round is completed. For example, the gaming server 110 can cause a QR code 310 to be displayed on the gaming monitor 130 prior to a Texas hold'em style poker tournament. The gaming server 110 detects the play of each player in the tournament. Upon completion of a round, the gaming server 110 can further transmit a distinct secondary PIN code (not shown) to the user device 140 of the tournament players who have advanced to a subsequent round. As a subsequent round begins, the gaming server 110 cause another QR code 310 to be displayed on the gaming monitor 130. The gaming server 110 can request a user to enter the secondary PIN code into their user device 140 as verification of eligibility to advance to the subsequent round.

Figure 4:
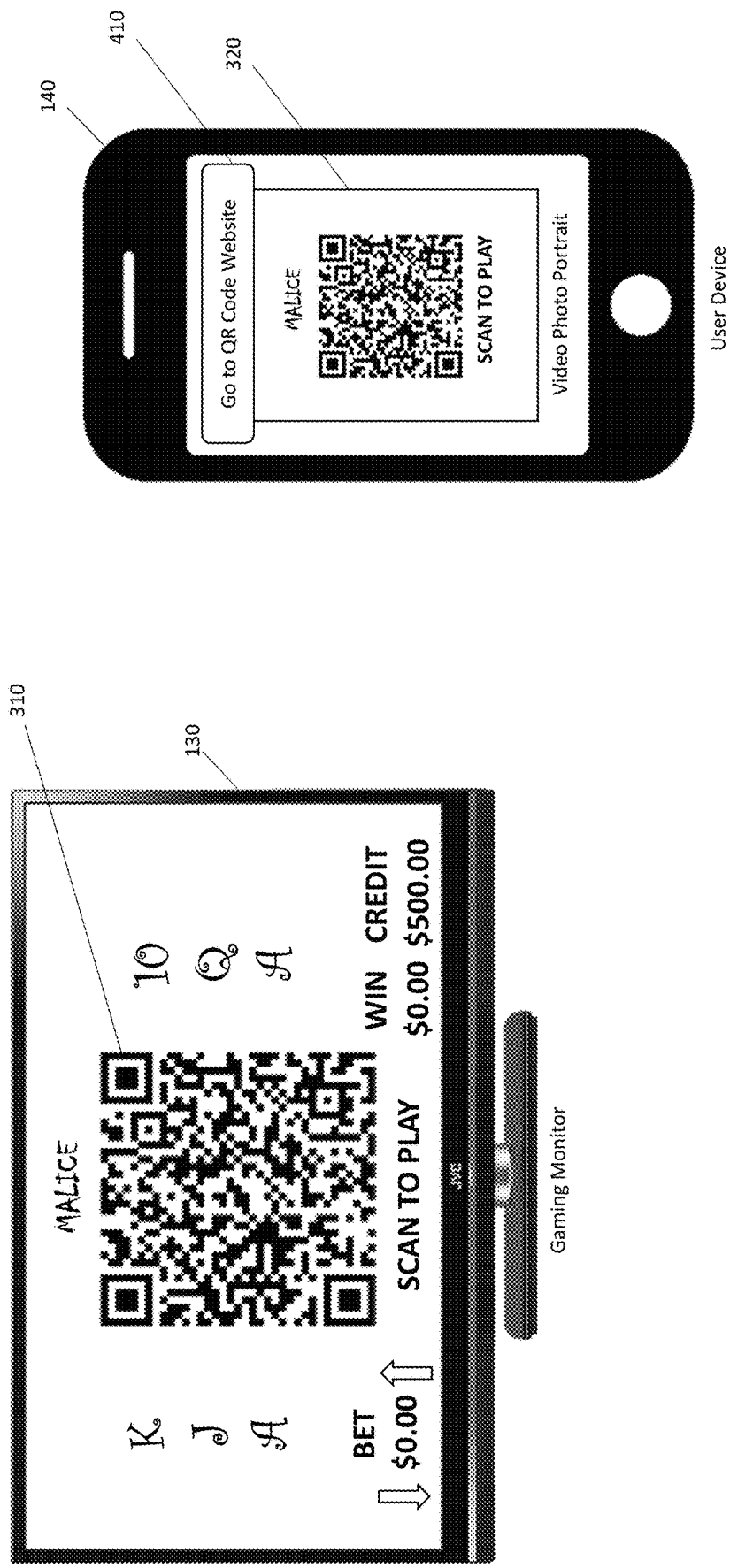
FIG. 4 depicts a screen of a gaming monitor and a screen of a user device consistent with the present invention.

FIG. 4 depicts a screen of a gaming monitor and a screen of a user device consistent with the present invention. After the QR code 310 is read on by the QR code reading app 320, the user device 140 will provide a prompt 410 to the user confirming that the user wants to load a web browser and go to the URL encoded within the QR code 310. The user can use the touchscreen functionality of the display of the user device 140 to confirm that the user wants to load the web browser and go to the website associated with the URL.

Figure 5:
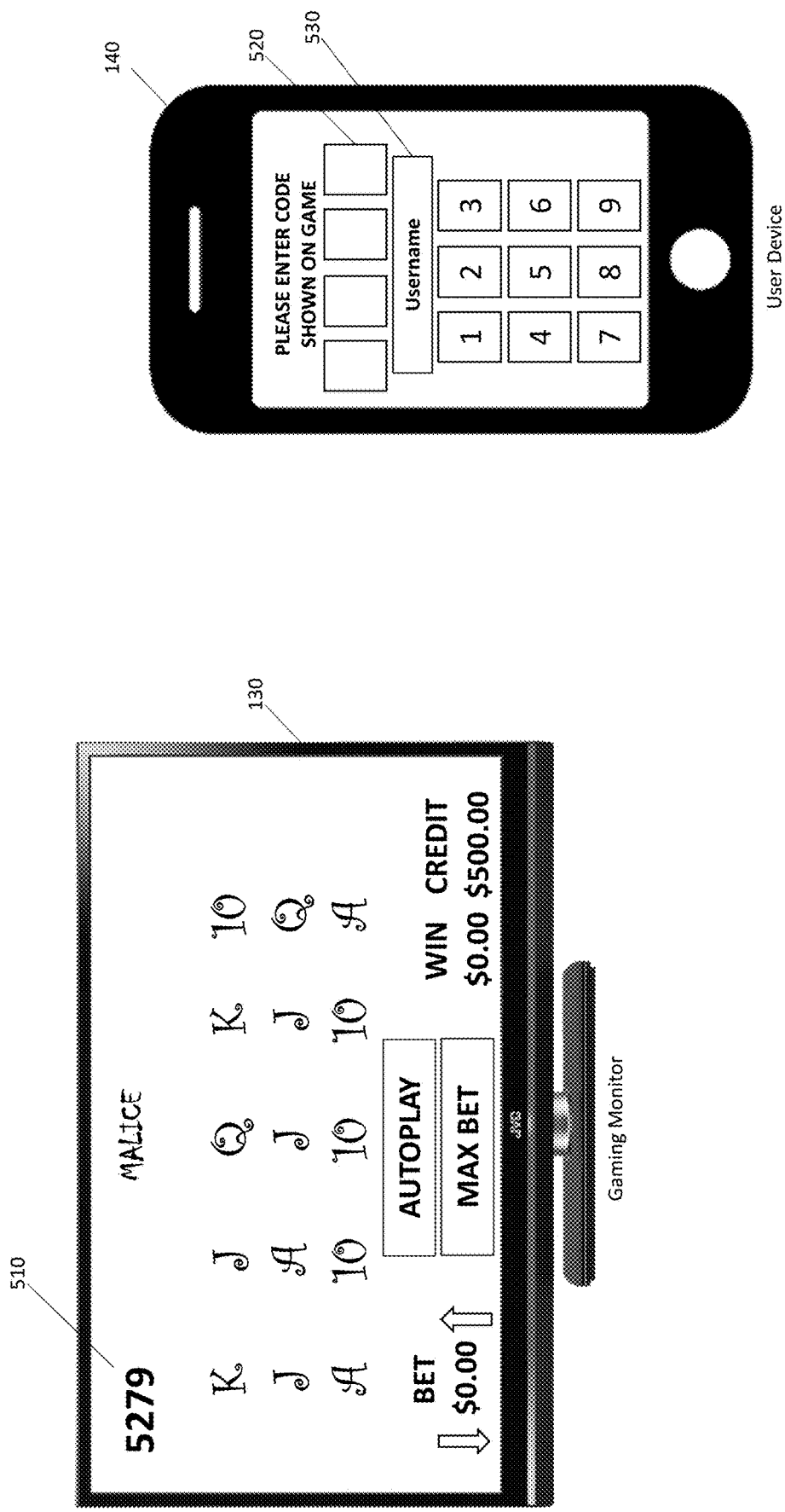
FIG. 5 depicts a screen of a gaming monitor and a screen of a user device consistent with the present invention.

FIG. 5 depicts a screen of a gaming monitor and a screen of a user device consistent with the present invention. When the user elects to follow the URL encoded within the QR code 310, a browser is brought up on the user device 140, which connects to the URL encoded within the QR code 310. A web site is served from gaming server 110 to the user device 140. In addition, a PIN code 510 is provided by the gaming server 110 and displayed on the gaming monitor 130. The PIN code 510 is an alphanumeric code. Displayed on the user device is field 520 for entering the PIN as well as an optional field 530 for entering a username. Once these are entered, the user device 140 returns the entered code and optional username to the gaming server 110. The gaming server 110 verifies that the entered PIN matched the PIN code 510 provided by the gaming server 110 to the gaming monitor 130. Once the entered PIN is verified, the user device 140 is linked to the gaming server 110 and the gaming monitor 130. If the entered PIN is not correct, the user device 140 is not connected to the gaming server 110 and the gaming monitor 130, and the user is prompted to try again.

Figure 6:
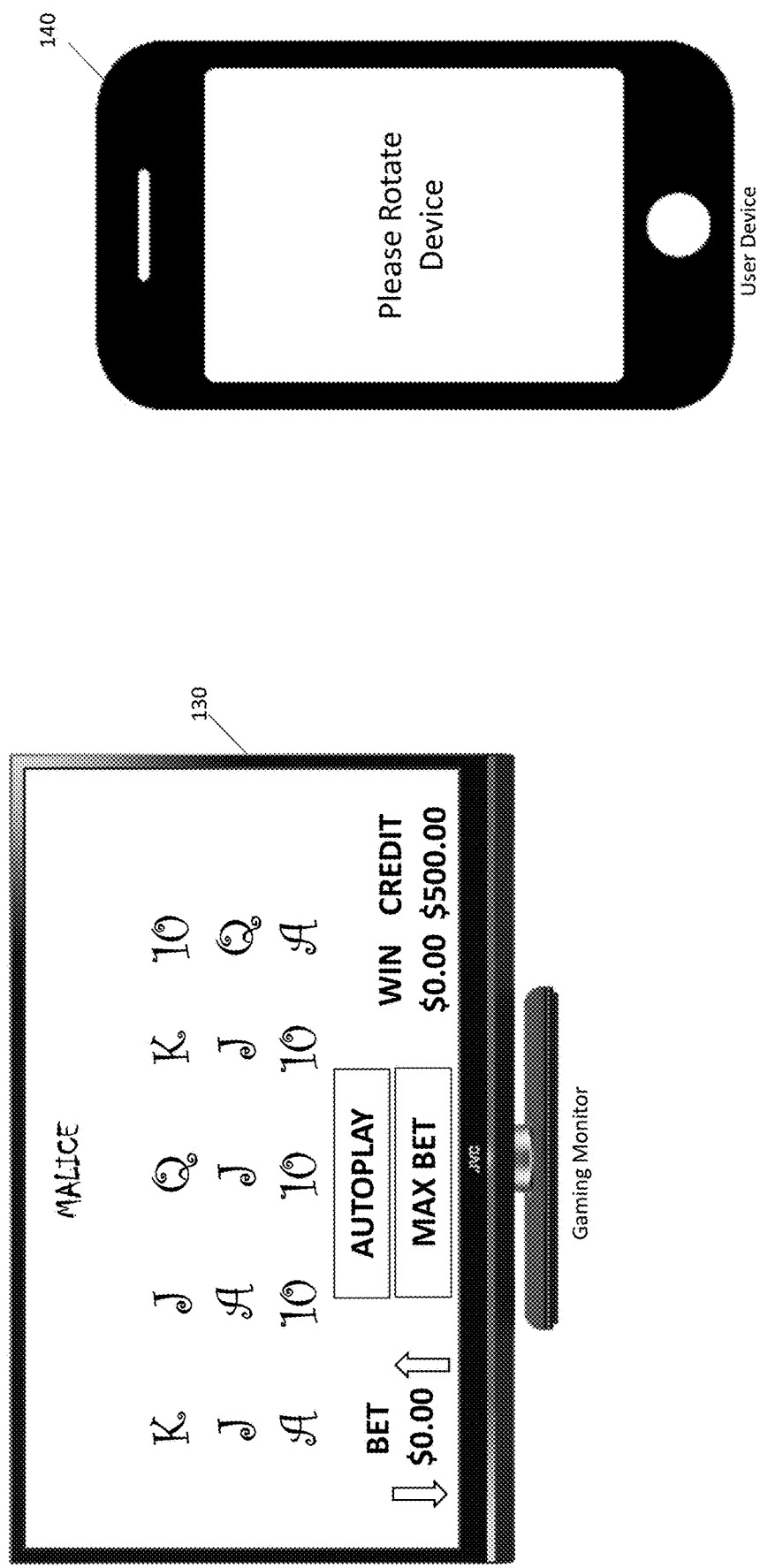
FIG. 6 depicts a screen of a gaming monitor and a screen of a user device consistent with the present invention.

FIG. 6 depicts a screen of a gaming monitor and a screen of a user device consistent with the present invention. Once the entered PIN is verified, the QR code 310 is removed as an overlay from the gaming monitor and the PIN code 510 is also removed as an overlay from the gaming monitor. The web browser used to enter the PIN and username on the user device 140 remains running on the user device 140, and the gaming server may optionally prompt the user to rotate the user device 140.

Figure 7:
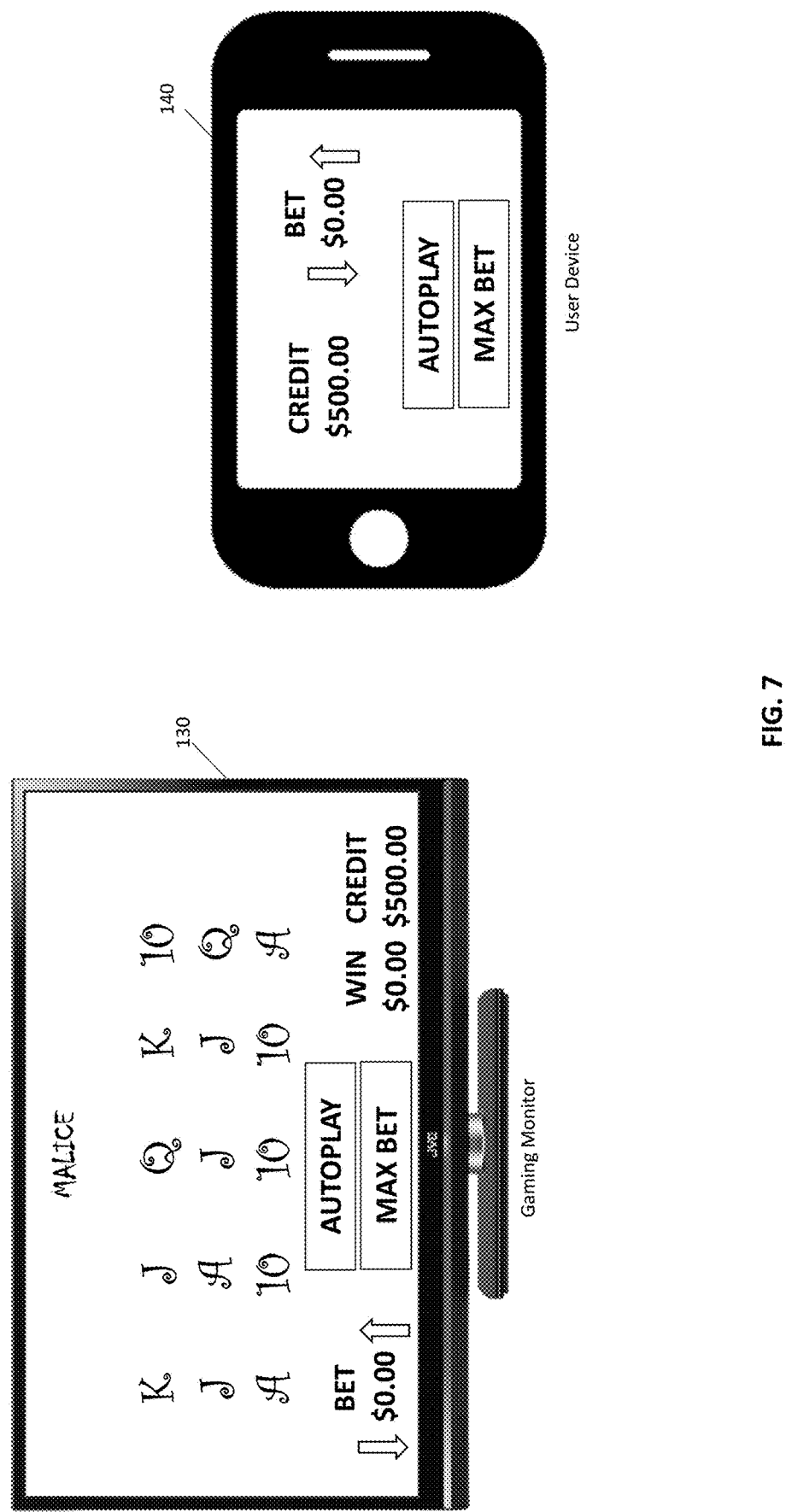
FIG. 7 depicts a screen of a gaming monitor and a screen of a user device consistent with the present invention.

FIG. 7 depicts a screen of a gaming monitor and a screen of a user device consistent with the present invention. Once the user device 140 is in a correct orientation, either because it was originally oriented correctly or because a user rotates the user device 140 following a rotation, the user device 140 display user controls that she can use to control the game displayed on the gaming monitor 130. The user controls on the user device 140 are served from the gaming server 110 to the web browser running on the user device 140. The user controls may be customized for each game, and sound effects may be emitted from the user device 140 at the direction of the gaming server 110.

As described above, multiple user devices may be used by respective multiple players to all play the same game. For example, multiple players can engage in a bingo game. The gaming server 110 can cause a QR code 310 to overlay on top of the gaming monitor 130. Each user can use their user device 140 to scan the QR code 310 displayed on the gaming monitor 130. After the QR code 310 is read by each QR code reading app 320, each user device 140 will provide a prompt 410 to a respective user confirming that the user wants to load a web browser and go to the URL encoded within the QR code 310. Each user elects to follow the URL encoded within the QR code 310, a browser is brought up on each user device 140, which connects to the URL encoded within the QR code 310. A web site is served from gaming server 110 to the user device 140. In addition, a PIN code 510 is provided by the gaming server 110 and displayed on the gaming monitor 130. Each user device displays a field 520 for entering the PIN code 510 as well as a field 530 for entering a username and an optional field for a secondary PIN code. The gaming monitor displays a PIN code 510 and each user can use the same PIN code 510. Once these are entered, each user device 140 returns the entered code and their username and/or secondary PIN code to the gaming server 110. The gaming server 110 verifies that each user's entered PIN matches the PIN code 510 provided by the gaming server 110 to the gaming monitor 130. The gaming server 110 also verifies that each user has entered a unique username for the game, such that one username does not match another username. If one or more of the users has entered the same username, the gaming server 110 will cause a prompt to be displayed on the offending user's user devices to select an alternate username. Once the gaming server verifies each entered PIN and that each username is unique, each user device 140 is linked to the gaming server 110 and the gaming monitor 130. If any entered PIN is not correct or username is a duplicate, the offending user device 140 is not connected to the gaming server 110 and the gaming monitor 130, and the user is prompted to try again.

Figure 8:
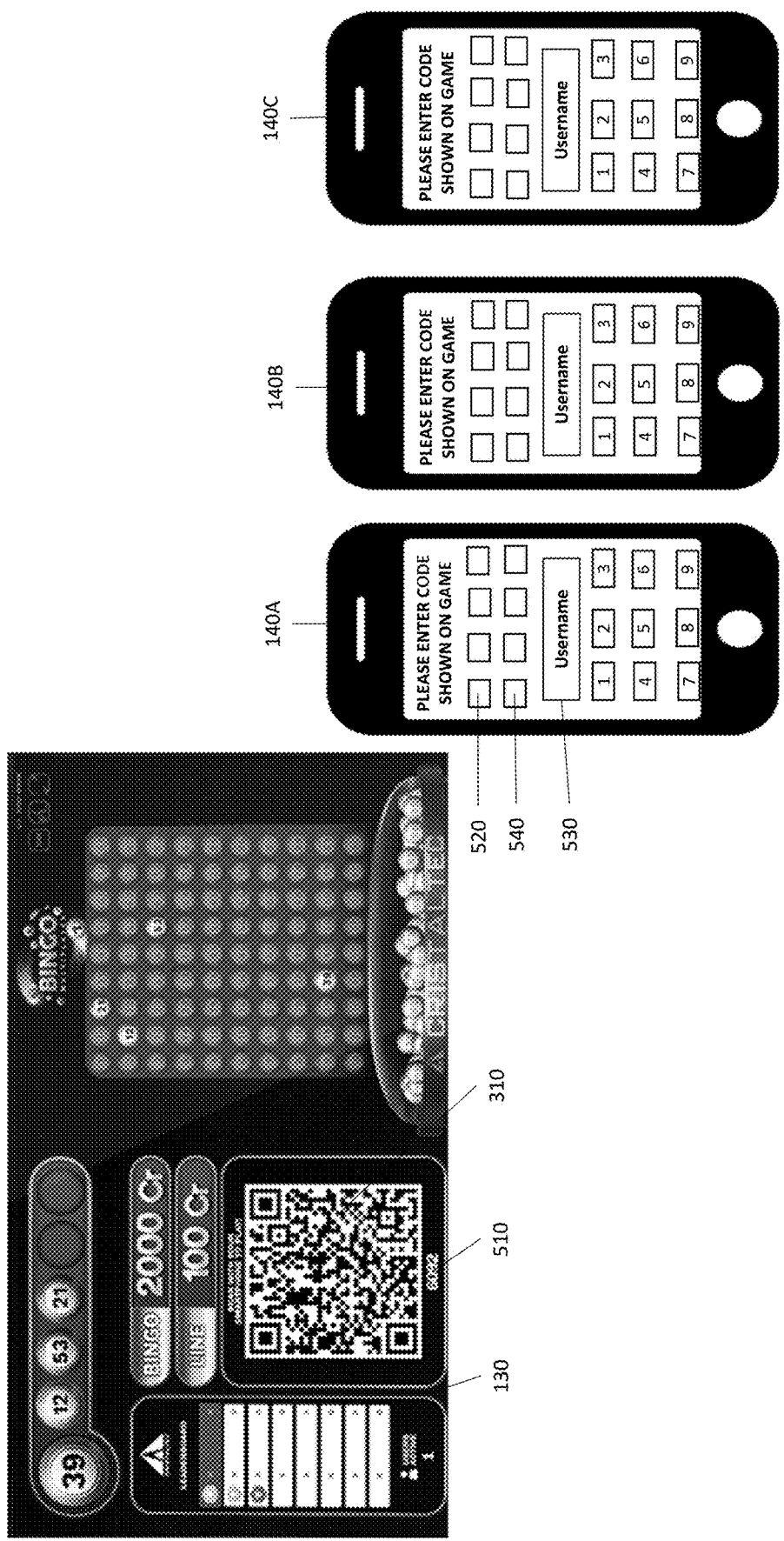
FIG. 8 depicts a screen of a gaming monitor and respective screens of a plurality of user devices consistent with the present invention.
Figure 9:
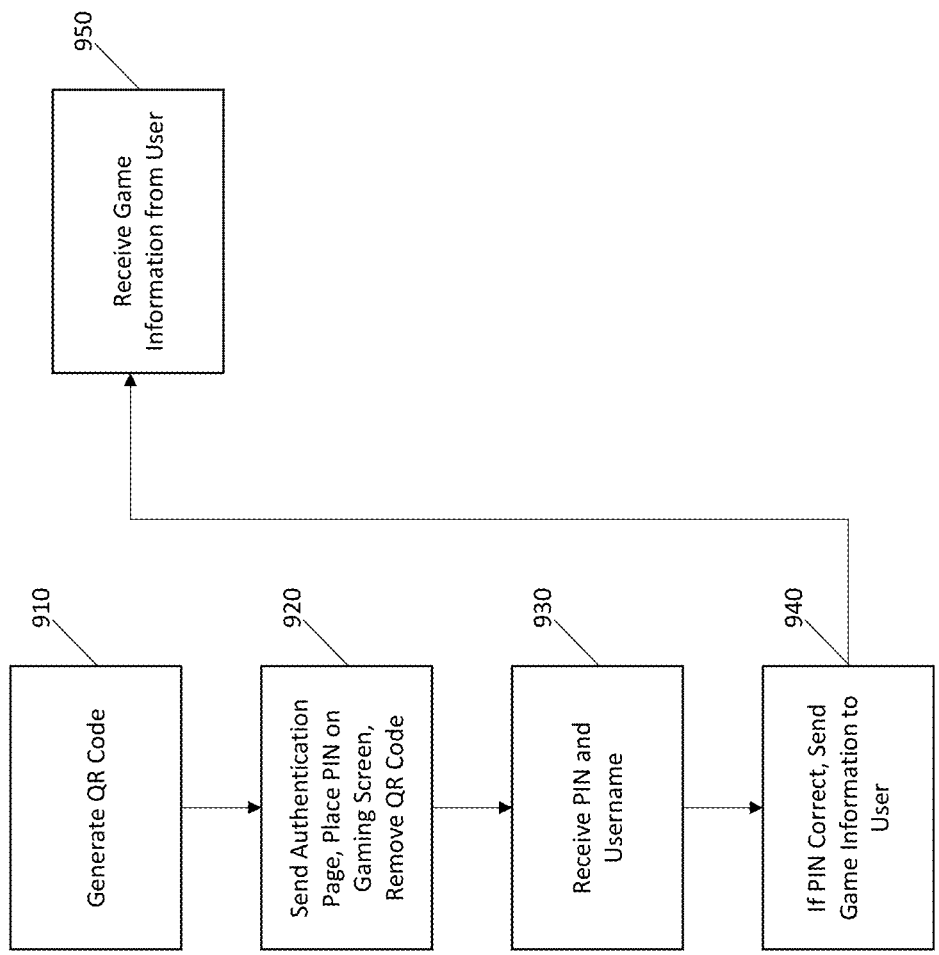
FIG. 9 depicts a flow chart of a method of connecting and interacting with a user device consistent with the present invention.

FIG. 8 depicts a flow chart of a method of connecting and interacting with a user device consistent with the present invention. A QR code 310 is generated by the gaming server and send to a gaming monitor 130. (Block 810). The QR code 310 includes an encoded URL for a gaming website that allows a user to access a current gaming session. A user scans the QR code 310 on his user device 140 through a photography or QR code 310 reading app and then follows, using the user device's web browser, a link embedded within the QR code 310 to a URL hosted on the gaming server 110. An authentication page is served to the user device's web browser from the gaming server 110, a PIN is placed on the gaming monitor 130, and the QR code 310 is removed from the gaming monitor 130. (Block 820). The authentication page has a field for the user to enter the PIN code 510 displayed on the gaming monitor 130 and, in some embodiments of the present invention, a field to enter her username.

A user enters a PIN into the PIN code field on the user device 140 and optionally enters her username into the username field and secondary PIN in a secondary PIN code field (not shown). The gaming server 110 receives the entered PIN and optionally the username. (Block 830). If the entered PIN matches the displayed PIN, the gaming server 110 provides a user interface to the user via the web browser on the user device 140. (Block 840). Game information, e.g., button mashes and text entry, entered by the user on the user device 140 is then received by the gaming server 110. (Block 850). As described above, in some instances, a user is playing in a tournament style game. For example, the user may advance to a subsequent round and be in a position to carry over winnings from a previous round to the subsequent round. Furthermore, the user may take a break between rounds. In these instances, the gaming server 110 can encode the user's winnings into a secondary PIN code, such that upon entering the secondary PIN code into the user device 140, the gaming server 110 translates the encoded secondary PIN code to determine the user's winning from a previous round. The gaming server 110 then causes the user's winnings from a previous round to be displayed on the user's device 140. In some embodiments of the present invention, the gaming server 110 further causes the winnings to be displayed on the gaming monitor 130. The encoded secondary PIN code can be an alphanumeric code that encrypts the value of a user's winnings. The winnings can include cash, tokens, credits, or other valuables used to play the game.

The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A computer-implemented method comprising:
generating, using a processor, a quick response (QR) code containing a web address for a gaming session;
providing, using the processor, the QR code to a monitor;
receiving, using the processor, a request for serving a web page for the web address from a user device;
providing, using the processor, an authentication page for entering a PIN code to the user device;
providing, using the processor, a PIN code to the monitor;
receiving, using the processor, an entered code from the user device; and
when the entered code matches the PIN code, associating the user device with the gaming session.

2. The computer-implemented method of claim 1, wherein the authentication page further includes a username field.

3. The computer-implemented method of claim 2, further comprising receiving, using the processor, a username from the user device.

4. The computer-implemented method of claim 1, further comprising providing, using the processor, gaming controls to the user device.

5. The computer-implemented method of claim 4, further comprising receiving, using the processor, gaming inputs from the user device.

6. The computer-implemented method of claim 1, further comprising associating, using the processor, a second user device with the gaming session.

7. The computer-implemented method of claim 6, wherein associating the second user device comprises:
receiving, using the processor, a second entered code from the second user device;
matching, using the processor, the second entered code to the provided PIN code;
receiving, using the processor, a second username associated with the second user device; and
verifying, using the processor, that the second username does not match a username associated with the user device.

8. A system comprising:
a memory;
a processor coupled to the memory, the processor operable to execute instructions stored in the memory, the instructions causing the processor to:
generate a quick response (QR) code containing a web address for a gaming session;
provide the QR code to a monitor;
receive a request for serving a web page for the web address from a user device;
provide an authentication page for entering a PIN code to the user device;
provide a PIN code to the monitor;
receive an entered code from the user device; and
when the entered code matches the PIN code, associate the user device with the gaming session.

9. The system of claim 8, wherein the authentication page further includes a username field.

10. The system of claim 9, wherein the instructions further cause the processor to receive a username from the user device.

11. The system of claim 8, wherein the instructions further cause the processor to provide gaming controls to the user device.

12. The system of claim 11, wherein the instructions further cause the processor to receive gaming inputs from the user device.

13. The system of claim 8, further wherein the instructions further cause the processor to associate a second user device with the gaming session.

14. The system of claim 13, wherein associating the second user device comprises:
receiving a second entered code from the second user device;
matching the second entered code to the provided PIN code;
receiving a second username associated with the second user device; and
verifying that the second username does not match a username associated with the user device.

15. A computer program product for controlling a process comprising a non-transitory computer readable storage medium having program instructions embodied therewith, the program instructions executable by a computer, to cause the computer to perform a method comprising:
generating, using a processor, a quick response (QR) code containing a web address for a gaming session;
providing, using the processor, the QR code to a monitor;
receiving, using the processor, a request for serving a web page for the web address from a user device;
providing, using the processor, an authentication page for entering a PIN code to the user device;
providing, using the processor, a PIN code to the monitor;
receiving, using the processor, an entered code from the user device; and
when the entered code matches the PIN code, associating the user device with the gaming session.

16. The computer program product of claim 15, wherein the authentication page further includes a username field.

17. The computer program product of claim 16, further comprising receiving, using the processor, a username from the user device.

18. The computer program product of claim 15, further comprising providing, using the processor, gaming controls to the user device.

19. The computer program product of claim 18, further comprising receiving, using the processor, gaming inputs from the user device.

20. The computer program product of claim 15, further comprising associating a second user device with the gaming session.

* * * * *